United States Patent [19]
Yumoto

[11] Patent Number: 5,860,019
[45] Date of Patent: Jan. 12, 1999

[54] DATA DRIVEN INFORMATION PROCESSOR HAVING PIPELINE PROCESSING UNITS CONNECTED IN SERIES INCLUDING PROCESSING PORTIONS CONNECTED IN PARALLEL

[75] Inventor: Manabu Yumoto, Nara, Japan

[73] Assignee: Sharp Kabushiki Kaisha, Osaka, Japan

[21] Appl. No.: 677,866

[22] Filed: Jul. 10, 1996

[30] Foreign Application Priority Data

Jul. 10, 1995 [JP] Japan .................................. 7-173685

[51] Int. Cl.⁶ .................................................. G06F 15/16
[52] U.S. Cl. ...................... 395/800.26; 395/395; 395/377
[58] Field of Search ........................ 395/800.01, 800.25, 395/800.26, 800.27, 377, 379, 395

[56] References Cited

U.S. PATENT DOCUMENTS

| | | | |
|---|---|---|---|
| 3,962,706 | 6/1976 | Dennis et al. | 395/672 |
| 4,149,240 | 4/1979 | Misunas et al. | 395/800.25 |
| 5,105,873 | 4/1992 | Maejima et al. | 395/377 |
| 5,218,706 | 6/1993 | Komori et al. | 395/800.26 |
| 5,535,413 | 7/1996 | Ishikawa et al. | 395/800.25 |
| 5,640,525 | 6/1997 | Yumoto et al. | 395/377 |

FOREIGN PATENT DOCUMENTS 4-340678  11/1992  Japan .
5-20152   3/1993  Japan .

OTHER PUBLICATIONS

English Translation of Excerpt from IWANAMIJOHOKA-GAKUJITEN, IWANAMI, 1990, pp.1–6 and 493–497.

*Primary Examiner*—Larry D. Donaghue

[57] ABSTRACT

A data driven information processor includes an input control processing portion having a plurality of outputs which receives an input data packet from an immediately preceding pipeline processing unit and outputs the input data packet to one output according to a prescribed allocation method, a plurality of processing portions connected in parallel to the plurality of outputs, and an output control portions which receives a data packet output from the plurality of processing portions and outputting the packet to an immediately succeeding pipeline processing unit. One of the plurality of processing units is selected by a counter or based on the content of the input data packet.

21 Claims, 12 Drawing Sheets

C: SELF-TIMED TRANSFER CONTROL ELEMENT 5,860,019

DATA DRIVEN INFORMATION PROCESSOR HAVING PIPELINE PROCESSING UNITS CONNECTED IN SERIES INCLUDING PROCESSING PORTIONS CONNECTED IN PARALLEL

BACKGROUND OF THE INVENTION

1. Field of the Invention

The present invention relates generally to the field of information processing, and more particularly, to increasing the processing speed of a data driven information processor.

2. Description of the Related Art

A data driven processor which is based on the data driven principles is supposed to be an inherently natural information processing method and a generic term for a series of processors developed from research projects to effectively execute an object program directly converted from an executable high-level language.

The data driven principles will be described below. Instructions of a program attain an executable state if argument data necessary for its execution all arrives in the form of token (firing). An instruction upon thus becoming executable is sent to a function processor together with its parameter data and an address for an execution result. The processing of determining if the instruction is executable or not and the processing of sending an executable instruction to the function processor together with its parameter data and the address for execution result are implemented by a firing control unit.

A corresponding instruction is executed in the function processor and the result of execution of the instruction is transferred in the form of token as argument data for an instruction to be executed next based on the address.

Since execution of an instruction is driven in response to the arrival of a token, such computing method is called data driven method. FIG. 1 is a diagram for use in illustration of the data driven principles. An instruction fires in response to the arrival of a token from the right or left input arc. The data of operation result (the result of executing the instruction) is then output as a token to the output arc.

The principles are described in *IWANAMIJOUHOUKAGAKUJITEN*, Iwanami, pp. 494–497, 1990.

The data driven information processor is a system including a cyclic pipeline connection of a data pair producing unit for firing control (hereinafter alternatively referred to as firing control unit), a function processing unit (hereinafter alternatively referred to as FP), a program storing unit (hereinafter alternatively referred to as PS), and a data input/output control portion (hereinafter alternatively referred to as I/O).

FIG. 2 is a block diagram showing the structure of essential portions of such a data driven processor. Referring to FIG. 2, a processor including a cyclic pipeline connection of basic functions such as a firing control (matching) unit, a function processing unit, a program storing unit, a data input/output control portion will be described by way of illustration.

This system employs as a basic configuration for data transfer and processing, a cascade connection of temporary storing units (data latches) based on hand shaking type data transfer control using a plurality of C elements (self-timed transfer control elements) as shown in FIG. 3. A data packet which is a working packet of a physical standard autonomously selects a flow path within the configuration by a self path selecting function, and therefore, as it is sequentially processed by the functional elements for passage therethrough, execution of information processing also autonomously proceeds. Introducing such system removes a system bus, a system clock, a centralized processor and the like from processors, and control of the entire system is completely distributed.

The processing speed of the data driven processor is essentially determined based on the internal circuit configuration of the C elements in FIG. 3 and the natural scientific properties of the device. Determining the internal circuit configuration of the C elements therefore determines possible processing time for inter-stage processing between cascade connection networks of temporary storing units according to the hand shaking type data transfer control under these conditions.

In a usual operation, the operation is divided into lower-order operation elements, which are processed on a several-stage-basis, in other words pipeline dividing processing is conducted.

FIG. 4 is a diagram partially showing the configuration of a conventional data driven information processor. Data driven information processor 1C includes a series-connection of processing portions 3A, 3B, and 3C. A data packet input to the processor is processed by processing portion 3A and output to processing portion 3B. Processing portion 3B receives the data packet output from processing portion 3A and processes and outputs the packet to processing portion 3C. Processing portion 3C receives the data packet output from processing portion 3B processes the data packet for output.

Among the data driven information processing elements, there is a processing portion which requires processing time relatively longer than the other processing portions, which makes difficult pipeline dividing processing or there is a case in which the pipeline dividing processing is inherently difficult.

The pipeline dividing processing is difficult when mismatches arise with respect to standard processing time by the other processing portions if such pipeline dividing processing is conducted in the case of multiplication processing, for example, in other words the processing time is extremely short or long. The pipeline dividing processing is inherently difficult, for example, in the case of the main processing of the firing control portion.

FIG. 5 is a diagram showing an example of a logic circuit for a processing portion which requires processing time relatively longer than the other processing portions, and corresponds to the internal configuration of processing portion 3B is FIG. 4.

Processing in the example shown in FIG. 5 proceeds as follows. The processing portion receives a data packet. Stated differently, the signal on a C1 terminal 971 is pulled to an H level with the signal on an RO terminal 973 being at an L level, while a necessary L level or H level is applied to a D terminal 977 as information. After a certain time period determined by the internal circuit configuration of the C elements, an H level pulse is output from the CP terminal of C element 901 to the CK terminal of a data latch 921, and necessary data is temporarily held in data latch 921. Then, if the RO terminal of C element 911 with delay in the next stage is at an H level (which level indicates that no packet is present in the stage), in other words if the R1 terminal of C element 901 is at an H level, an L level is output from the CO terminal of C element 901 to the C1 terminal of C element 911 with delay. Accordingly, after a certain time period as is the case with C element 901, an H level pulse is output from the CP terminal of C element 911 with delay to the CK terminal of a data latch 922, and the data is temporarily held in data latch 922 (the packet is transferred). A processing portion 931 takes in necessary information from the Q terminal of data latch 922 for executing processing, and outputs the result of execution to a data latch 923. Based on the processing time by processing portion 931, in other words in response to completion of output of the result of execution to data latch 923 by processing portion 931 (time delay by C element 911 with delay is set to cause the above-described operation), an L level and an H level are output from the CO terminal and RO terminal of C element 911 with delay, respectively.

More specifically, this stage does not accept a packet from a preceding stage for a longer period of time as compared to the other stages, based on the processing time by processing portion 931. Thereafter, the packet is transferred in the same order as a transfer of signal at the time of packet transfer from the stage of C element 901 to the stage of C element 911 with delay.

SUMMARY OF THE INVENTION

It is an object of the invention to provide a data driven information processor capable of addressing increase in processing time and decrease in throughput if there is a processing unit requiring processing time relatively longer than the other processing units among pipeline processing units in the data driven processor and pipeline dividing processing is difficult.

Another object of the invention is to provide a data driven information processor free from local stagnation of data packets if there is a processing unit requiring processing time relatively longer than the other processing units among pipeline processing units in the data driven information processor and pipeline dividing processing is difficult.

Yet another object of the invention is to provide a data driven information processor capable processing data packets in parallel at a plurality of processing portions if there is a processing unit requiring processing time relatively longer than the other processing units among pipeline processing units in the data driven information processor and pipeline dividing processing is difficult.

An additional object of the invention is to provide a data driven information processor capable of immediately processing a received data packet at a processing portion other than a processing portion processing a data packet received immediately before.

According to the present invention, the data driven information processor includes a plurality of pipeline processing units connected in series. At least one of the plurality of pipeline processing units includes an allocation circuit for allocating an input data packet received from another pipeline processing unit to one of a plurality of its outputs according to a prescribed allocation method, a plurality of processing circuits connected in parallel to the respective plurality of outputs of the allocation circuits for conducting prescribed processing to the data packet, and an output circuit for receiving and outputting the data packet output from the plurality of processing circuits to an immediate succeeding pipeline processing unit.

The allocation circuit preferably includes a counter circuit connected to another pipeline processing unit for updating the number of values for allocation in response to input of a data packet, and a designation circuit for designating one of the plurality of processing circuits connected in parallel based on the output of the counter circuit.

The allocation circuit may include a designation circuit connected to another pipeline processing unit for designating one of the plurality of processing circuits based on the content of an input data packet.

The allocation circuit of at least one pipeline processing unit in the data driven information processor receives an input data packet from another pipeline processing unit and outputs the packet to one of the plurality of outputs according to prescribed allocation processing. The plurality of processing circuits connected in parallel to the plurality of outputs of the allocation circuit processes data packets which they receive. The output circuit receives a data packet output from the plurality of processing circuits and outputs the data packet to an immediate succeeding pipeline processing unit. The plurality of processing circuits can process data packets in parallel and therefore the data driven information processor is free from local stagnation of data packets. As a result, increase in processing time and decrease in throughput can be prevented.

The designation circuit of the allocation circuit selects one processing circuit designated by the counter circuit among the plurality of processing circuits connected in parallel. The count of the counter circuit is updated every input of a packet, and therefore a received data packet is immediately processed at a processing circuit other than a processing circuit processing a data packet received immediately before. Local stagnation of data packets can therefore be prevented.

The designation circuit of the allocation circuit designates one of the plurality of processing circuits based on the content of an input data packet. Processing is executed at a prescribed processing circuit corresponding to the information of the input data packet. Therefore, data packets with appropriate information are input in an appropriate order, thereby preventing local stagnation of data packets.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described in conjunction with the accompanying drawings.

First Embodiment

Figure 1:
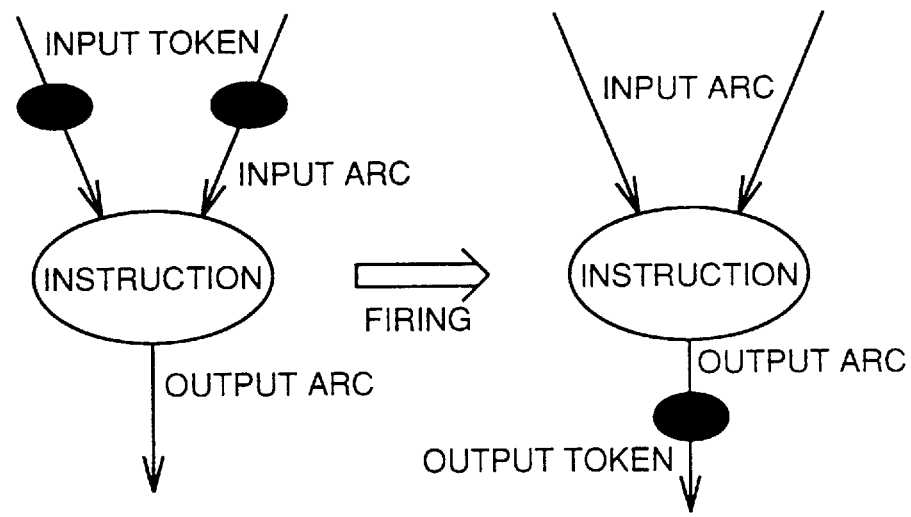
FIG. 1 is a diagram for use in illustration of data driven principles.
Figure 2:
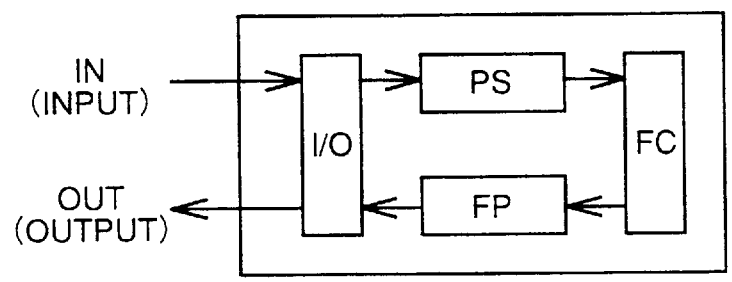
FIG. 2 is a diagram showing the configuration of essential parts of a data driven processor.
Figure 3:
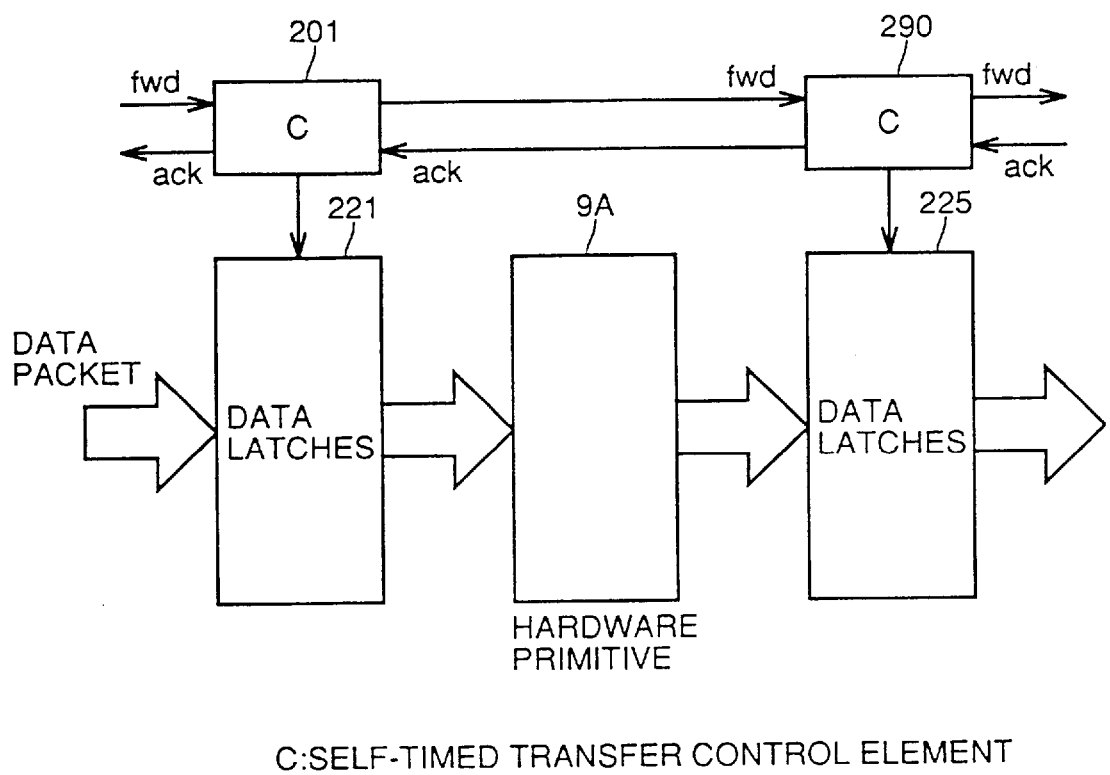
FIG. 3 is a diagram showing a self-timed data transfer processing unit.
Figure 4:
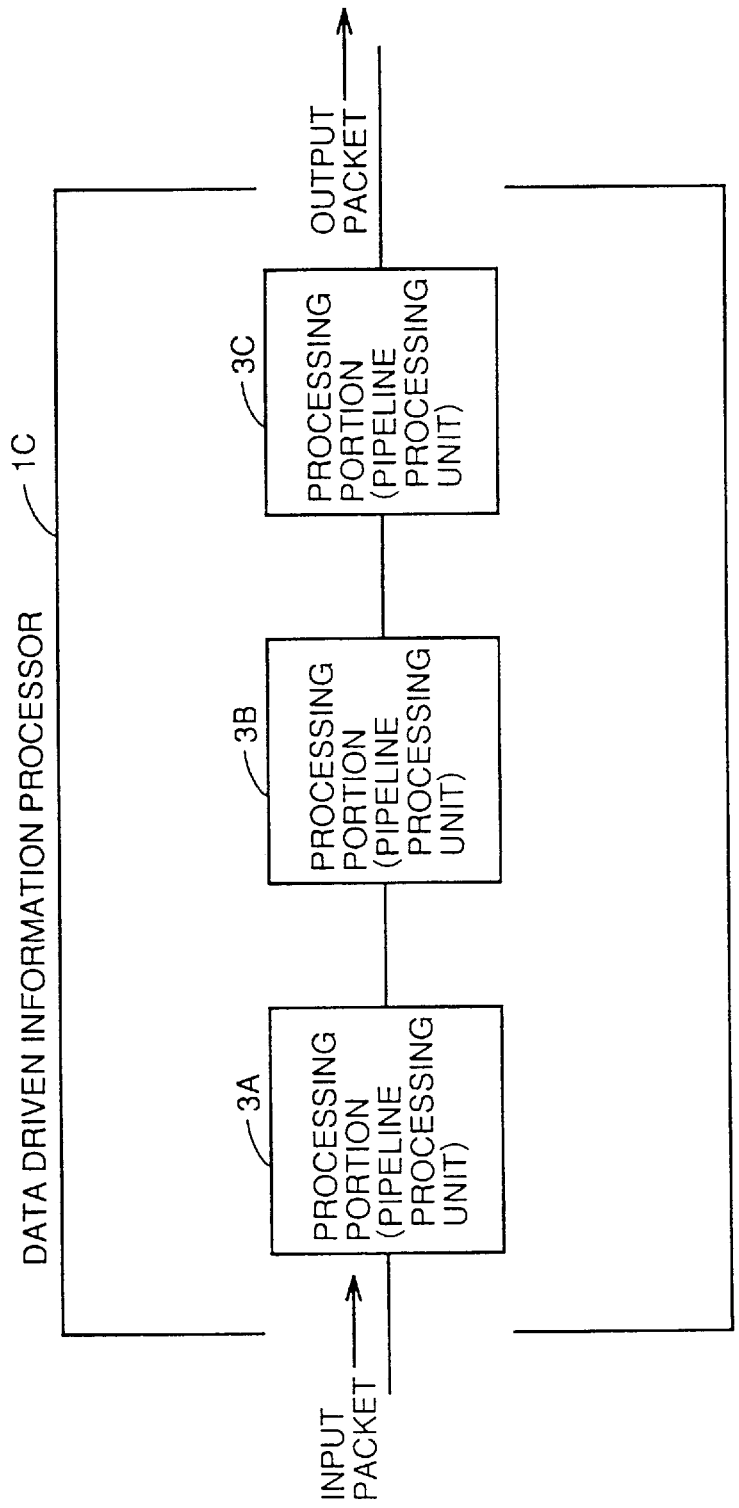
FIG. 4 is a diagram partially showing the configuration of a conventional data driven information processor.
Figure 5:
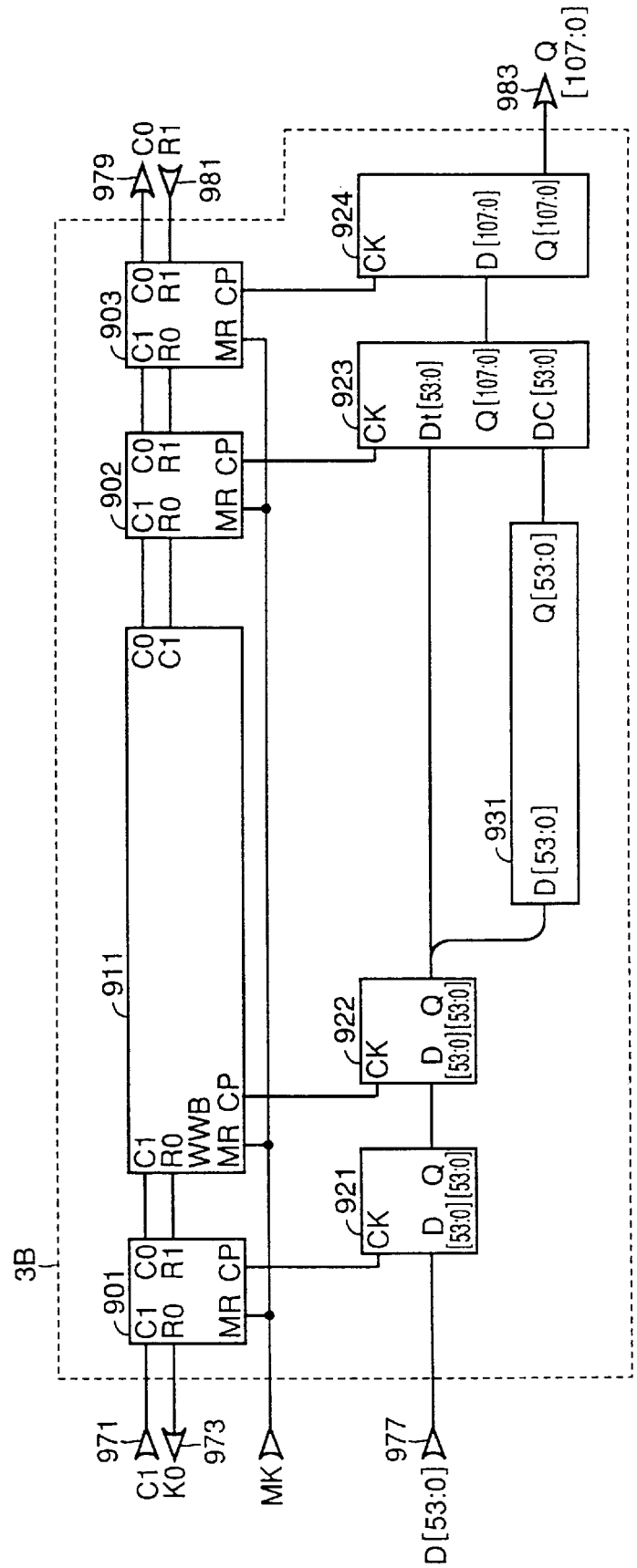
FIG. 5 is a logic circuit diagram showing in detail the configuration of essential parts of a conventional data driven information processor.
Figure 6:
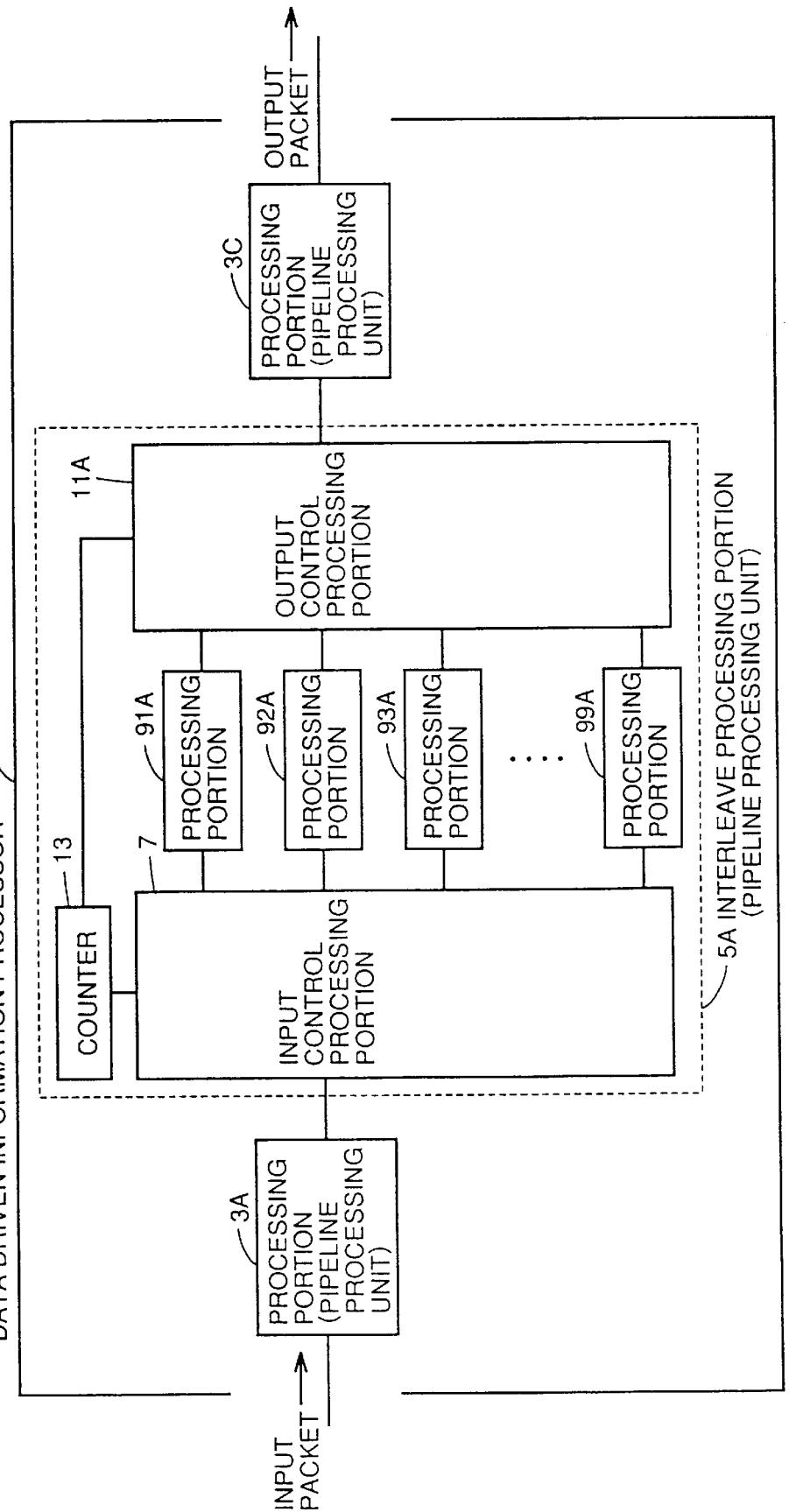
FIG. 6 is a diagram showing the configuration of essential parts of a data driven information processor according to a first embodiment of the present invention.

Referring to FIG. 6, data driven information processor 1A includes a processing portion (pipeline processing unit) 3A, an interleave processing portion (pipeline processing unit) 5A, and a processing portion (pipeline processing unit) 3C. In FIG. 6, the same elements as those in FIG. 4 are represented by the same reference numerals and characters and are not further detailed.

The output of processing portion 3A is connected to the input of interleave processing portion 5A, and the output of interleave processing portion 5A is connected to the input of processing portion 3C.

Interleave processing portion 5A includes an input control processing portion 7, N processing portions 91A, 93A, ..., 99A, an output control processing portion 11A, and a counter 13.

The input of input control processing portions 7 is connected to the output of processing portion 3A. The output of output control processing portion 11A is connected to the input of processing portion 3C. Processing portion 91A, 92A, 93A, ..., 99A each have an input connected to input control processing portion 7 and output control processing portion 11A, and provided in parallel therebetween. Input control processing portion 7 is connected with counter 13. Counter 13 is connected with output control processing portion 11A.

Figure 7:
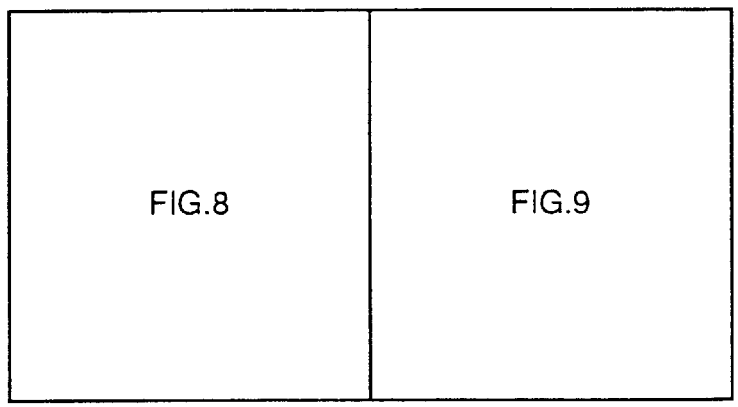
FIG. 7 shows the arrangement of logic circuit diagrams each showing in detail the configuration of essential part of the data driven information processor according to the first embodiment of the invention.
Figure 8:
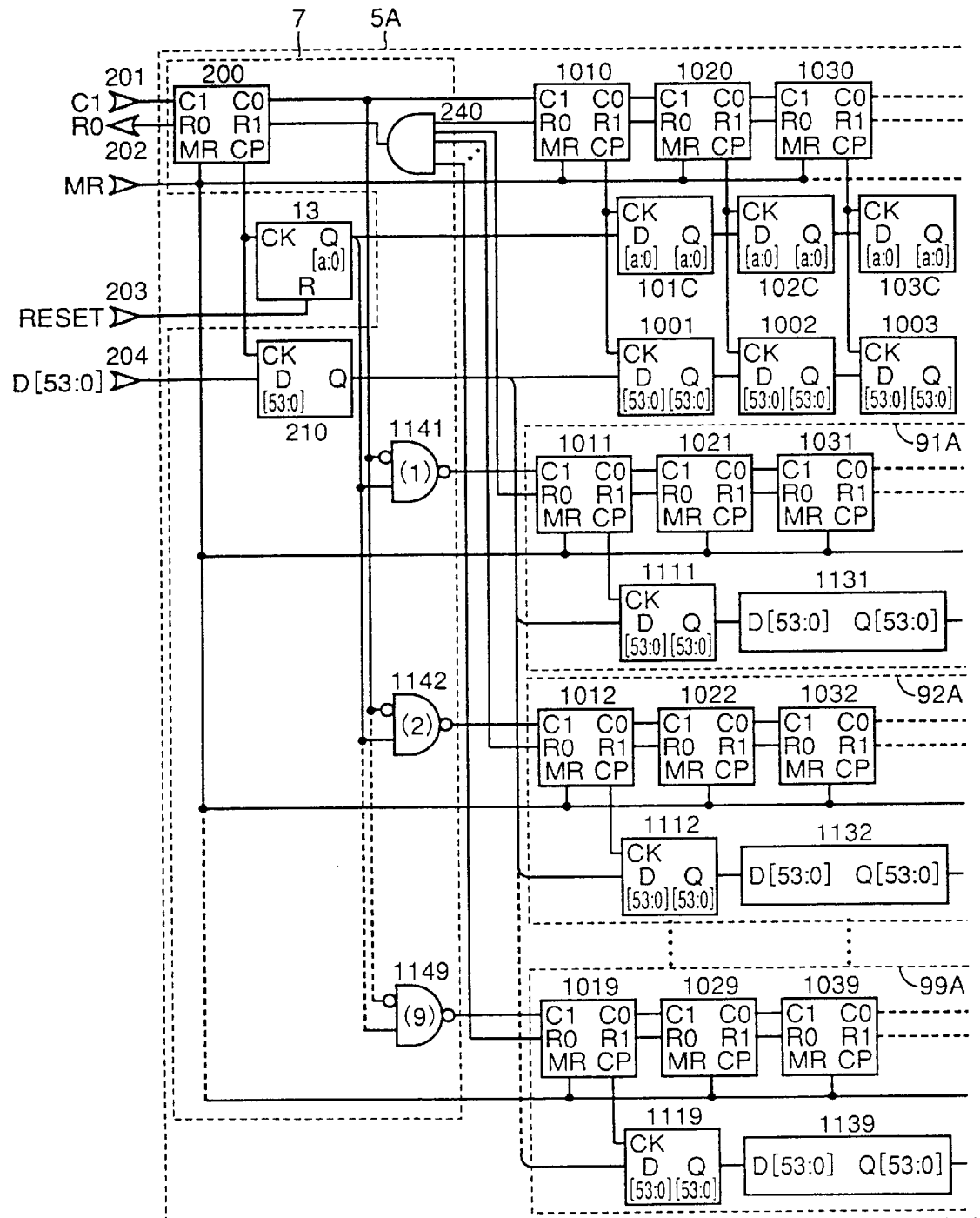
FIGS. 8 and 9 are diagrams each showing in detail the configuration of essential part of the logic circuit of the data driven information processor according to the first embodiment of the invention.
Figure 9:
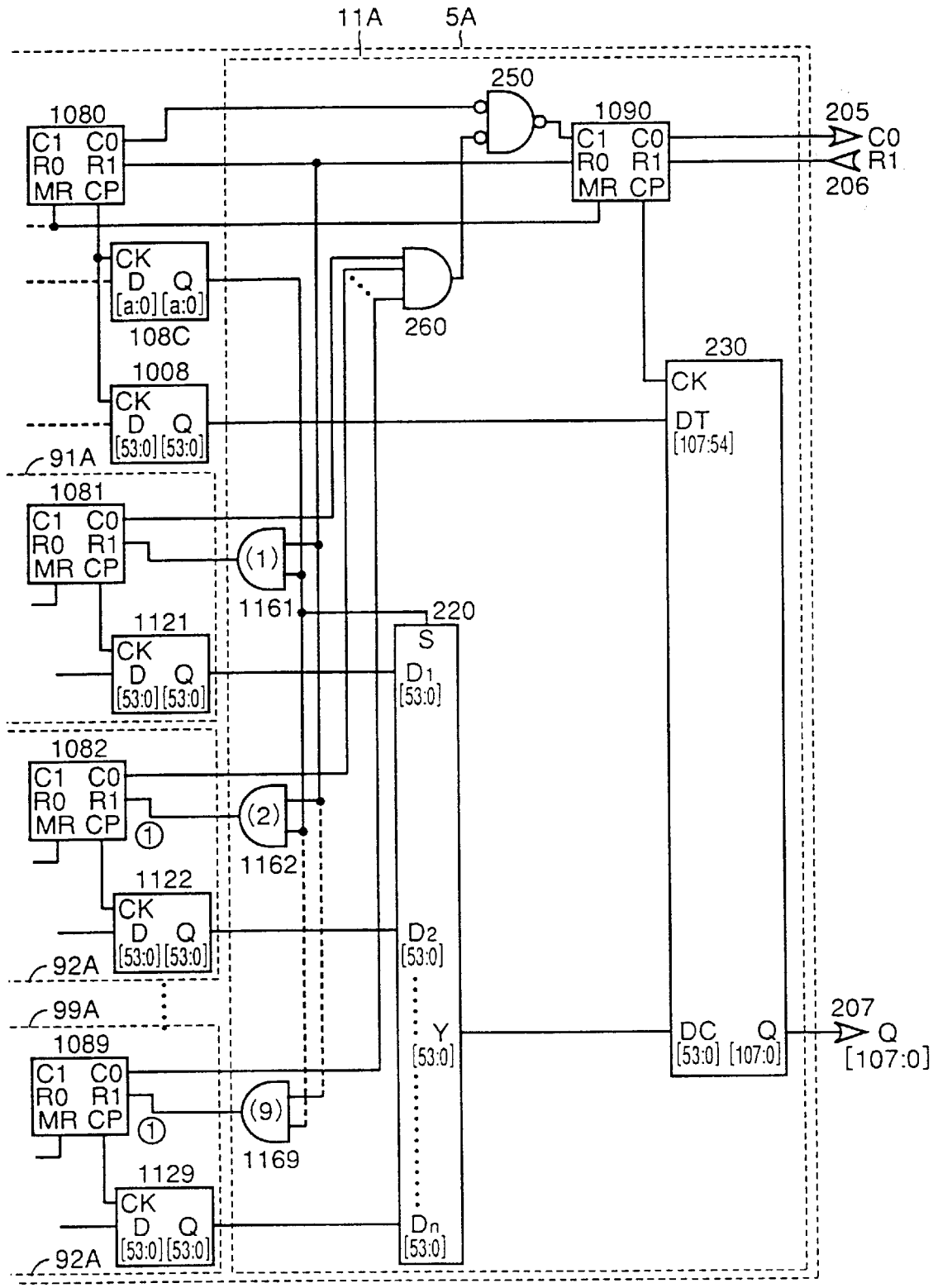

Referring to FIGS. 7, 8 and 9, the logic circuit according to the first embodiment will be described. FIG. 7 shows the arrangement of diagrams each showing part of the configuration of the logic circuit according to the first embodiment of the invention. FIG. 8 corresponds to the left part of the logic circuit of the first embodiment, and FIG. 9 to the right half.

Referring to FIGS. 8 and 9 in particular, interleave processing portion 5A includes a C element 200; C elements 1010, 1020, 1030, ..., and 1080; C elements 1011, 1021, 1031, ..., and 1081; C elements 1012, 1022, 1032, ..., and 1082 and so forth; C elements 1019 and 1029, 1039, ..., and 1089; and a C element 1090. Interleave processing portion 5A includes data latches 210 and 230; data latches 1001, 1002, 1003, ..., and 1008; and data latches 101C, 102C, 103C, ..., and 108C; and data latches 1111, 1121, 1112, 1122, ..., 1119, and 1129. Interleave processing portion 5A further includes a counter 13, processing portions 1131, 1132, ..., and 1139; a selector 220; logic gates 240, 250 and 260; logic gates 1141, 1142, ..., and 1149; and logic gates 1161, 1162, ..., and 1169.

C element 200 includes a C1 terminal 201, an RO terminal 202, a CO terminal, an R1 terminal, and a CP terminal. Data latch 210 includes a D terminal 204, a Q terminal, and a CK terminal. Counter 13 includes a CK terminal, a Q terminal, and an R terminal. C elements 1010, 1011, 1012, ..., and 1019 each include a C1 terminal. The C1 terminal and RO terminal of C element 200 and the D terminal of data latch 201 are each connected to processing portion (pipeline processing unit) 3A which is not shown. The CP terminal of C element 200 is connected to the CK terminal of counter 13. The CO terminal of C element 200 is connected to each C1 terminal of C elements 1011, 1012, ..., and 1019 through gate 1141, 1142, ..., 1149.

Referring to FIGS. 6, 7, 8 and 9, the operation of the data driven information processor according to the first embodiment will be described.

In FIG. 6, the input control processing portion 7 of interleave processing portion 5A receives a data packet input to the data driven information processor and processed by processing portion 3A. Counter 13 is incremented every time input control processing portion 7 receives a data packet, and takes a value from 1 to N to designate a processing portion for the next processing. Input control processing portion 7 selects the processing portion designated by counter 13 and outputs the data packet to the selected processing portion.

Referring to FIGS. 8 and 9 in particular, the operation when a data packet is input to interleave processing portion 5A will be described. More specifically, with the signal on RO terminal 202 being at an L level, an H level is applied to the signal on C1 terminal 201, and an L level or an H level necessary as information is applied to D terminal 204. Accordingly, an H level pulse is output from the CP terminal of C element 200 to the CK terminal of counter 13. (The output value of the Q terminal of counter 13 changes in the order of 1,2, 3, ..., N–1, N, 1, 2, ...) Thus, the Q terminal of counter 13 generally takes a value from 1 to N. It is assumed however that the counter 13 has been initialized with a RESET signal and has 1 as an initial value for readiness of description.

An L level is provided as an output signal from the CO terminal of C element 200. As a result, an L level is applied to the C1 terminal of C element 1010 an L level is applied to the C1 terminal of C element 1011 through gate 1141, and an H level is provided to the C1 terminals of C elements 1012 to 1019 through gates 1142 to 1149. Stated differently, a data packet is output to a path for bits not subject to processing by any processing portion, in other words a path via data latch 1001, and to a processing portion corresponding to a value output from counter 13 (a path via processing portion 1131 in this case).

Then, if there is no packet in a succeeding stage, an H level following an L level is output to the R1 terminal of C element through gate 240. In response to the arrival of the packet to C element 200, the value of counter 13 is increased by 1 (to 2 in this case), and a data packet is output to a path for bits not subject to processing and to a path through processing portion 1132.

Output of a packet to a succeeding stage from the stage of C element 200 thereafter follows the same process. Meanwhile, data packets processed at the processing portions are sequentially output to processing portion 3C (not shown) through C elements 1090 and data latch 230 by selector 220 and control gates 250, 260, 1161, 1162, ..., and 1169.

Note that if the initial value of counter 13 takes one of the values from 1 to N, the R terminal of counter 13 is not necessary. Also, in this embodiment 54 bits are provided for input data D and 108 bits for output data Q, but the number of bits may be arbitrary.

As described above, serial data packets can always be processed sequentially and in parallel at separate processing portions (91A–99A). Therefore, if a processing element requiring processing time relatively longer than the other processing elements exits, and pipeline dividing processing is difficult, local stagnation of data packets can be prevented. As a result, increase in processing time and decrease in throughput can be prevented.

Second Embodiment

Now, referring to FIGS. 10, 11, 12 and 13, the operation of a data driven information processor according to a second embodiment of the invention will be described. The data driven information processor according to the second embodiment in FIG. 10 includes a processing portion (pipeline processing unit) 3A, an interleave processing portion (pipeline processing unit) 5B and a processing portion (pipeline processing unit) 3C. The output of processing portion 3A is connected to the input of interleave processing portion 5B, and the output of interleave processing portion 5B is connected to the input of processing portion 3C. Interleave processing portion 5B includes an input control processing portion 7, N processing portions 91B, 92B, 93B, . . . , 99B, and an output control processing portion 11B.

Figure 11:
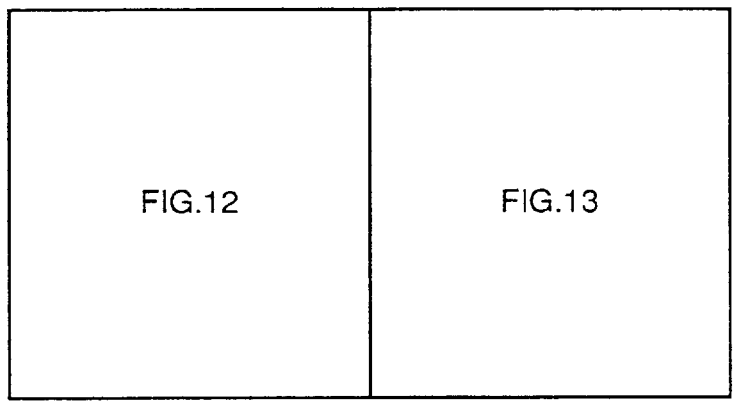
FIG. 11 shows the arrangement of diagrams each showing the configuration of essential part of the data driven information processor according to the second embodiment of the invention.
Figure 12:
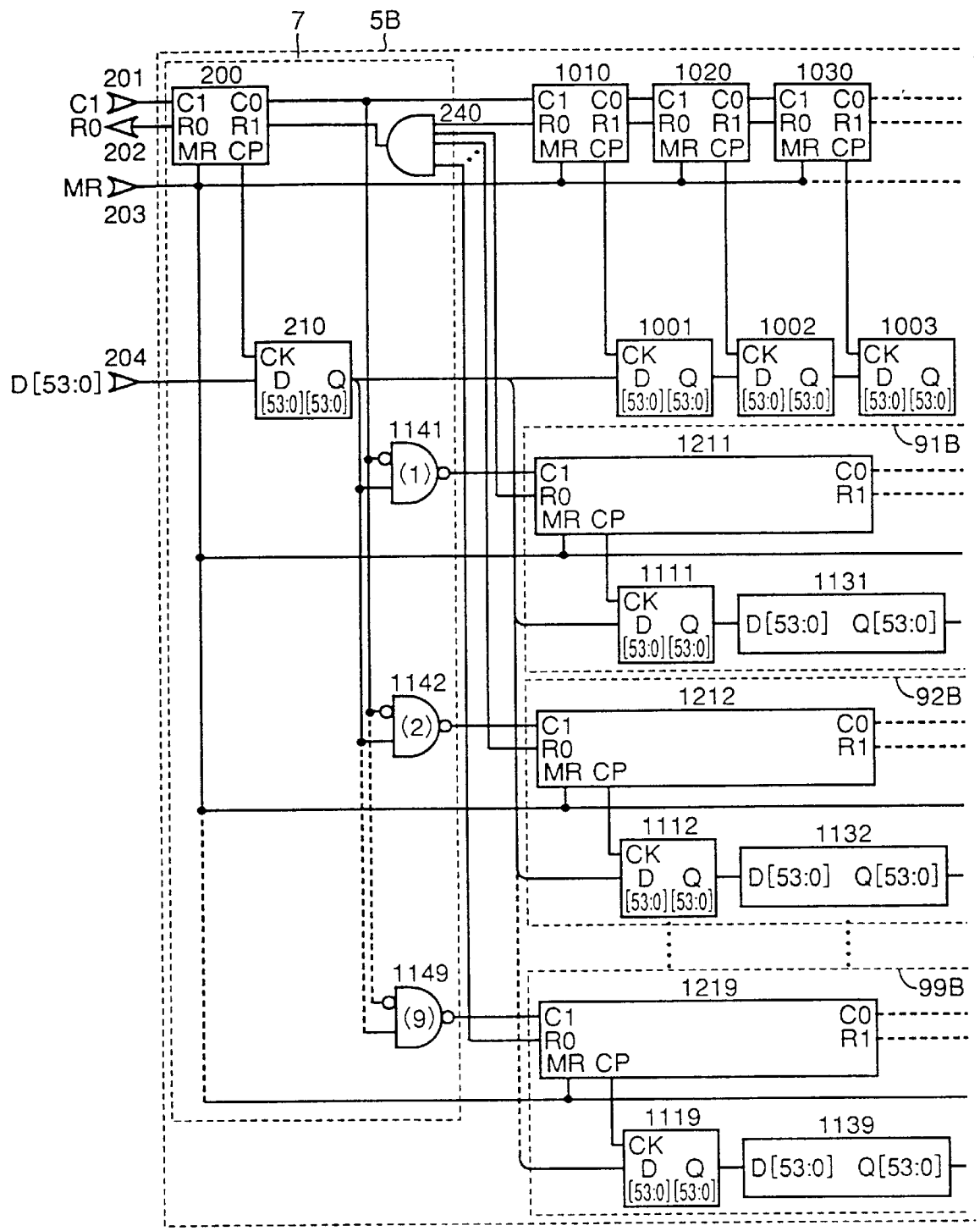
FIGS. 12 and 13 are diagrams each showing in detail the configuration of essential part of the logic circuit of the data driven information processor according to the second embodiment of the invention.
Figure 13:
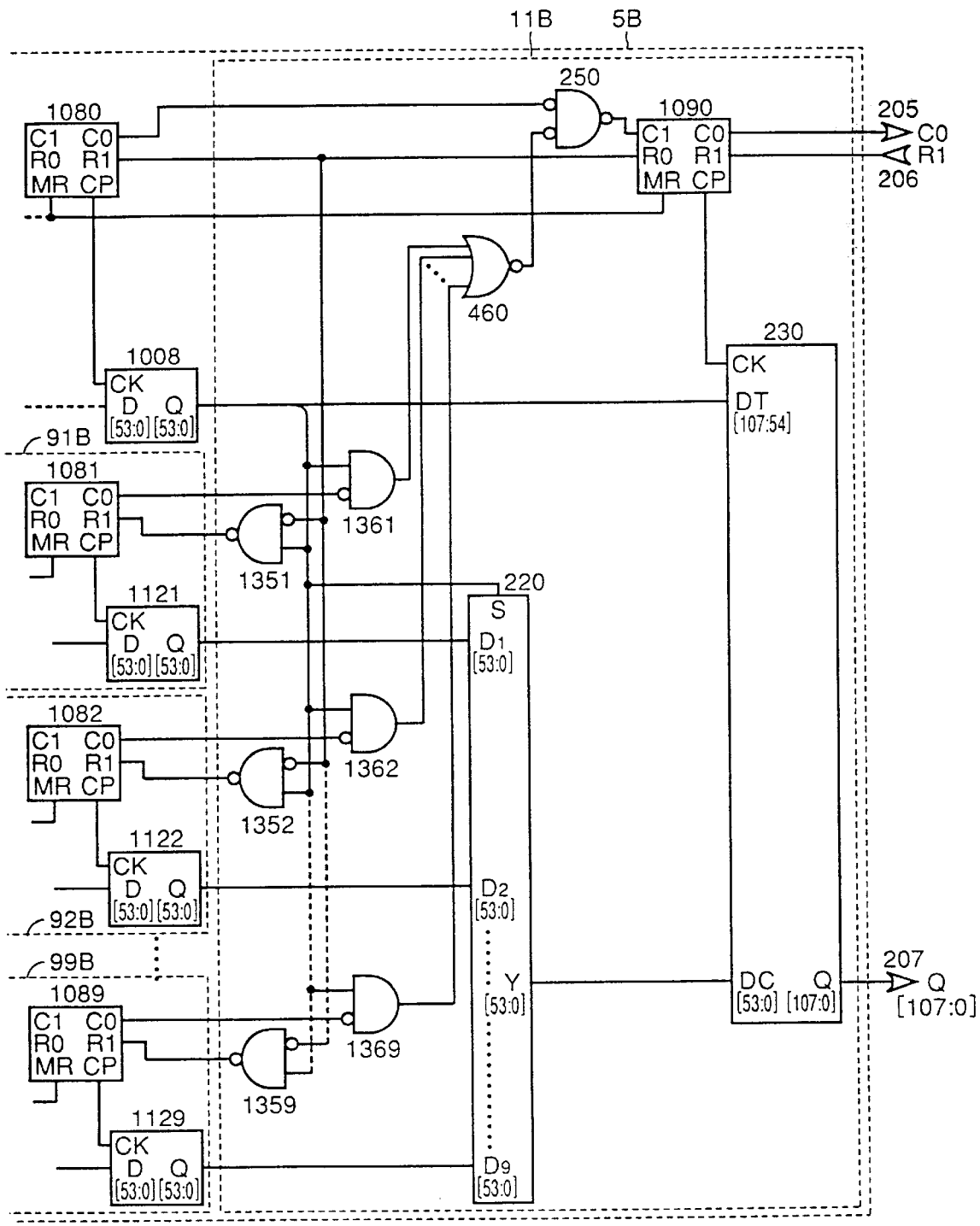

Referring to FIGS. 11, 12, and 13, the logic circuit according to the second embodiment will be described. FIG. 11 shows which figure corresponds to which part of the logic circuit according to the second embodiment, FIG. 12 corresponds to the left half of the logic circuit according to the second embodiment, and FIG. 13 to the right half.

Interleave processing portion 5B includes a C element 200; C elements 1010, 1020, 1030, . . . , and 1080; and C elements 1081, 1082, . . . , and 1089. Interleave processing portion 5B further includes C elements with delay 1211, 1212, . . . , and 1219. Interleave processing portion 5B further includes data latches 210, 1001, 1002, 1003, . . . , and 1008; data latches 1111, 1121, 1112, 1122, . . . , 1119, and 1129; a data latch 230; processing portions 1131, 1132, . . . , and 1139; a selector 220; logic gates 240, 250, and 460; logic gates 1141, 1142, . . . , and 1149; and logic gates 1361, 1362, . . . , and 1369. C element 200 includes a C1 terminal 201, an RO terminal 202, a CO terminal, an R1 terminal, and a CP terminal, and data latch 210 includes a D terminal 204, a Q terminal, and a CK terminal.

Figure 10:
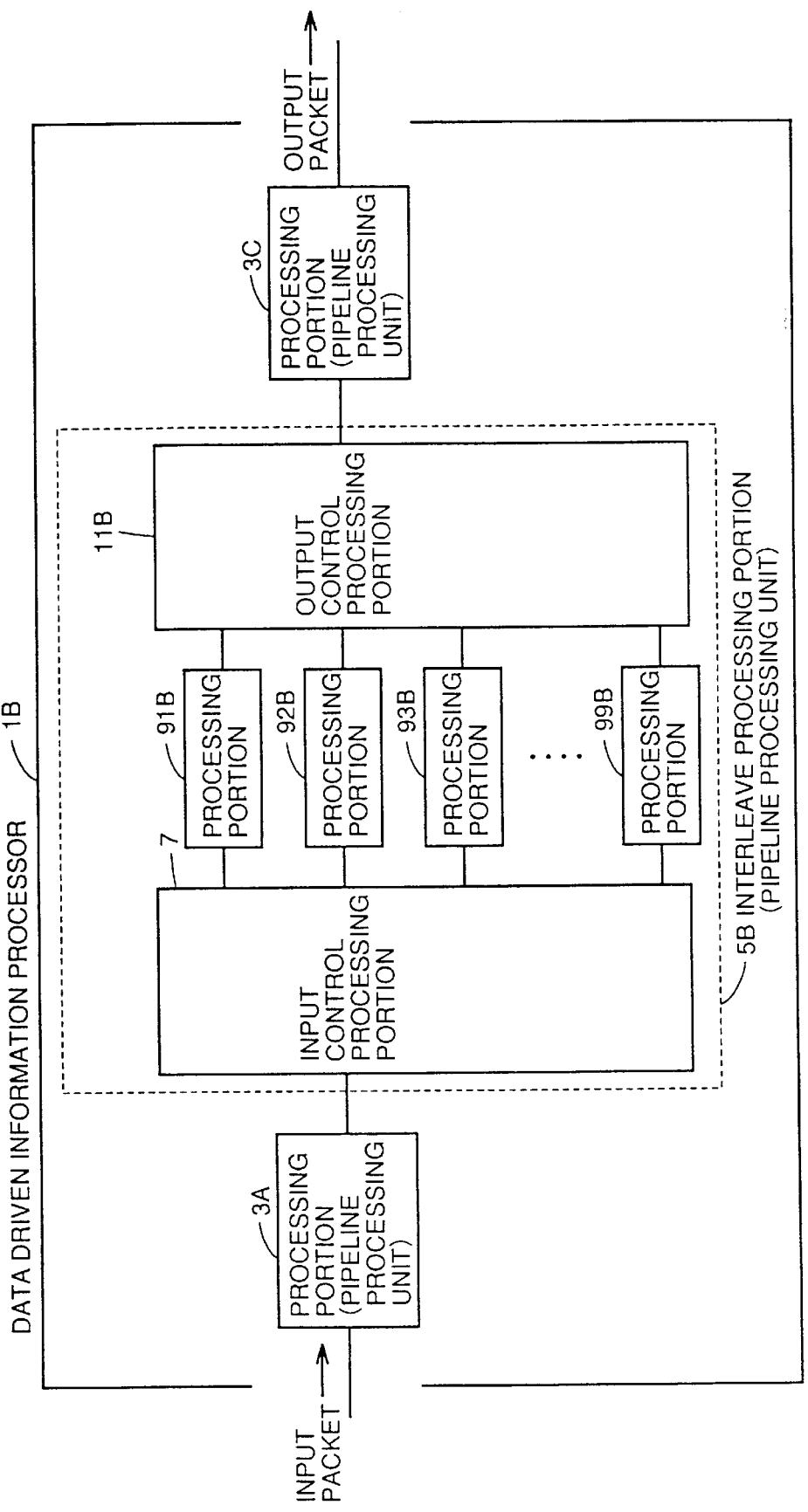
FIG. 10 is a diagram showing the configuration of essential part of a data driven information processor according to a second embodiment of the invention.

In FIG. 10, the input control processing portion 7 of interleave processing portion 5B receives a data packet input to the data driven information processor and processed by processing portion 3A. Based on the content of the data packet, one of processing portions 91B, 92B, and 99B is designated and the data packet is output to the designated processing portion.

The data packet subjected to prescribed processing by the selected processing portion is received by output control processing portion 11B and reaches processing portion 3C positioned immediately after and is processed therein, and then output from the data driven information processor.

Referring to FIGS. 12 and 13, a data packet is input to interleave processing portion 5B. In other words, With the signal on RO terminal 202 being at an L level, an H level is provided to the signal on C1 terminal 201, and an L level or an H level necessary as information is applied to D terminal 204. Accordingly, an H level pulse is output from the CP terminal of C element 200 to the CK terminal of data latch 210. Data for an arbitrary bits or a plurality of arbitrary bits in the data packet are used in a processing portion in a succeeding stage.

In the illustrated case, N+1 bits from the I-th bit to the I+N-th bit in the data packet are used. If the value of N+1 bits is 0, processing portion 1131 is selected, if the value is 1 processing portion 1132 is selected, for 2 processing portion 1133, for 3 processing portion 1134, and so forth. In other words if the value of N+1 bits is 0, an L level is applied as an output signal from the CO terminal of C element 200, therefore, an L level is applied to the C1 terminal of C element 1010, an L level applied to the C1 terminal of C element with delay 1211, through gate 1141, and an H level is provided to the C1 terminals of C elements with delay 1212 to 1219 through the corresponding gates. More specifically, a data packet is output to a path for bits not subjected to processing by any processing portion, i.e., a path through data latch 1001, and to processing portion 1139 corresponding to the value of N+1 bits from the i-th bit to the I+N-th bit in the input data packet.

If there is no data packet in a succeeding stage, an H level following an L level is output to the R1 terminal of C element 200 through gate 240.

The same processing is thereafter executed to in response to the values of the i-th bit to the I+N-th bit in input data packets. Meanwhile, the data packet processed at the corresponding processing portion is output to processing portion 3C (not shown) through C element 1090 and data latch 230 by selector 220, and control gates 250, 460, 1351, 1352, . . . , 1359, 1361, 1362, and 1369. Note that in this embodiment, the N+1 bits of the data packet are used as they are for the interleave processing, but a value produced by conversion of the value of N+1 bits may be used. In this embodiment, 54 bits are provided for input data D and 108 bits for output data Q, but arbitrary bit number may be provided.

As in the foregoing, the interleave processing is executed using the information of part of or the entire received data packet, input of data packets in an appropriate order allows for the prevention of local stagnation of data packets.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor including a plurality of pipeline processing units connected in series, wherein at least one of said plurality of pipeline processing units comprises:
allocation means receiving an input data packet from another pipeline processing unit for allocating the input data packet to one of a plurality of outputs thereof according to a prescribed allocation method;
a plurality of processing means connected in parallel to said respective plurality of outputs of said allocation means for conducting prescribed processing to the data packet, and
output means receiving the data packet output from said plurality of processing means for outputting the data packet to an immediately following pipeline processing unit.

2. The data driven information processor as recited in claim 1, wherein
said allocation means includes counter means connected to another pipeline processing unit and responsive to input of a data packet for updating the number of input data packets, and designation means for designating one of said plurality of parallel-connected processing means based on the output of the counter means.

3. The data driven information processor as recited in claim 2, wherein said designation means includes a transfer control element connected to the output of another pipeline processing unit for transmitting/receiving a timing signal for transfer of a data packet to/from said another pipeline processing unit, thereby controlling transfer of a data packet, said transfer control element updates said counter means in response to said timing signal, a plurality of logic means each having an input connected to said transfer control element and said counter means and an output connected to corresponding one of said plurality of processing means and responsive to the output of said transfer control element and the output of said counter means for applying a signal indicating the presence/absence of designation to said corresponding one of said plurality of processing means, and data latch means connected to the output of said another pipeline processing unit, the inputs of said plurality of processing means, and the output of said transfer control element, and responsive to a signal from said transfer control element for latching a data packet output from another pipeline processing unit to output the latched data packet to said plurality of processing means.

4. The data driven information processor as recited in claim 2, wherein said plurality of processing means each includes:
a transfer control element connected to said designation means and responsive to a signal input from said designation means taking a value indicative of the presence of designation for outputting a first signal;
data latch means connected to the output of said designation means and said transfer control element and responsive to said first signal for latching and holding the input data packet until a following first signal is received and outputting the data packet; and
data packet processing means connected to the output of said data latch means for conducting prescribed processing to the input data.

5. The data driven information processor as recited in claim 2, wherein said output means includes selecting means connected to the outputs of said plurality of processing means for selecting one of the outputs of said plurality of processing means based on the outputs of said counter means and outputting the data packet to a succeeding pipeline processing unit.

6. The data driven information processor as recited in claim 1, wherein said allocation means includes designation means connected to another pipeline processing unit for designating one of said plurality of processing means based on the content of the input data packet.

7. The data driven information processor as recited in claim 6, wherein said designation means includes:
a transfer control element connected to the output of another pipeline processing unit for transmitting/receiving a timing signal to/from that another pipeline processing unit when the data packet is transferred from the another pipeline processing unit, thereby controlling transfer of the data packet, said transfer control element outputting a signal indicating a timing for receiving the data packet from the another pipeline processing unit;
data latch means connected to the output of that another pipeline processing unit, the inputs of said plurality of processing means, and the output of said transfer control element, and responsive to a signal from said transfer control element for latching a data packet output from that another pipeline processing unit and outputting the data packet to said plurality of processing means; and
a plurality of logic means each having an input connected to said transfer control element and said data latch means and an output connected to corresponding one of said plurality of processing means, and responsive to the output of said transfer control element and the output of said data latch means for applying a signal indicating the presence/absence of designation to said corresponding one of said plurality of processing means.

8. The data driven information processor as recited in claim 6, wherein said plurality of processing means each include:
a transfer control element connected to said designation means and responsive to a signal input from said designation means taking a value indicative of the presence of designation for outputting a first signal;
data latch means connected to the output of said designation means and said transfer control element and responsive to said first signal for latching and holding the input data packet until a following first signal is received and outputting the data packet;
data packet processing means connected to the output of said data latch means for conducting prescribed processing to the input data packet.

9. The data driven information processor as recited in claim 6, wherein said output means includes selecting means connected to the outputs of said plurality of processing means for selecting one of the outputs of said plurality of processing means based on the output of said data latch means, thereby outputting the data packet to a succeeding pipeline processing unit.

10. The data driven information processor as recited in claim 1, wherein the plurality of processing means receives the data packet from the plurality of outputs.

11. A data driven information processor including a plurality of pipeline processing units connected in series, wherein at least one of said plurality of pipeline processing units comprises:
an allocation unit receiving an input data packet from another pipeline processing unit that allocates the input data packet to one of a plurality of outputs thereof according to a prescribed allocation method;
a plurality of processing portions connected in parallel to said respective plurality of outputs of said allocation unit that conducts prescribed processing to the data packet, and
an output unit that receives the data packet output from said plurality of processing portions and outputs the data packet to an immediately following pipeline processing unit.

12. The data driven information processor as recited in claim 11, wherein said allocation unit includes a counter connected to another pipeline processing unit and responsive to input of a data packet that updates the number of input data packets, and a designation unit that designates one of said plurality of parallel-connected processing portions based on the output of the counter.

13. The data driven information processor as recited in claim 12, wherein said designation unit includes a transfer control element connected to the output of another pipeline processing unit that transmits/receives a timing signal for transfer of a data packet to/from said another pipeline processing unit, thereby controlling transfer of a data packet, said transfer control element updates said counter in response to said timing signal, a plurality of logic units each having an input connected to said transfer control element and said counter and an output connected to corresponding one of said plurality of processing portions and responsive to the output of said transfer control element and the output of said counter that applies a signal indicating the presence/absence of designation to said corresponding one of said plurality of processing portions, and a data latch unit connected to the output of said another pipeline processing unit, the inputs of said plurality of processing portions, and the output of said transfer control element, and responsive to a signal from said transfer control element that latches a data packet output from another pipeline processing unit to output the latched data packet to said plurality of processing units.

14. The data driven information processor as recited in claim 12, wherein said plurality of processing portions each includes:
a transfer control element connected to said designation unit and responsive to a signal input from said designation unit taking a value indicative of the presence of designation that outputs a first signal;
a data latch connected to the output of said designation means and said transfer control element and responsive to said first signal that latches and holds the input data packet until a following first signal is received and that outputs the data packet; and
a data packet processing unit connected to the output of said data latch that conducts prescribed processing to the input data.

15. The data driven information processor as recited in claim 12, wherein said output unit includes a selecting unit connected to the outputs of said plurality of processing portions that selects one of the outputs of said plurality of processing portions based on the outputs of said counter and outputs the data packet to the succeeding pipeline processing unit.

16. The data driven information processor as recited in claim 11, wherein said allocation unit includes a designation unit connected to another pipeline processing unit that designates one of said plurality of processing portions based on the content of the input data packet.

17. The data driven information processor as recited in claim 16, wherein said designation unit includes:
a transfer control element connected to the output of another pipeline processing unit that transmits/receives a timing signal to/from that another pipeline processing unit when the data packet is transferred from the another pipeline processing unit, thereby controlling transfer of the data packet, said transfer control element outputting a signal indicating a timing for receiving the data packet from the another pipeline processing unit;

a data latch connected to the output of the another pipeline processing unit, the inputs of said plurality of processing portions, and the output of said transfer control element, and responsive to a signal from said transfer control element that latches a data packet output from that another pipeline processing unit and outputs the data packet to said plurality of processing portions; and a plurality of logic units each having an input connected to said transfer control element and said data latch and an output connected to corresponding one of said plurality of processing portions, and responsive to the output of said transfer control element and the output of said data latch that applies a signal indicating the presence/absence of designation to said corresponding one of said plurality of processing portions.

18. The data driven information processor as recited in claim 16, wherein said plurality of processing portions each include:
a transfer control element connected to said designation unit and responsive to a signal input from said designation unit taking a value indicative of the presence of designation for outputting a first signal;
a data latch connected to the output of said designation unit and said transfer control element and responsive to said first signal that latches and holds the input data packet until a following first signal is received and outputs the data packet;
a data packet processing unit connected to the output of said data latch that conducts prescribed processing to the input data packet.

19. The data driven information processor as recited in claim 16, wherein said output unit includes a selecting unit connected to the outputs of said plurality of processing portions that selects one of the outputs of said plurality of processing portions based on the output of said data latch, and thereby outputs the data packet to a succeeding pipeline processing unit.

20. The data driven information processor as recited in claim 11, wherein the plurality of processing portions receives data packet from the plurality of outputs.

21. A method for processing information in a data driven information processor including a plurality of pipeline processing units connected in series, comprising the steps of:

receiving an input data packet at one of the plurality of pipeline processing units from another pipeline processing unit;

allocating the input data packet to one of a plurality of outputs thereof according to a prescribed allocation method;

conducting prescribed processing to the data packet using a plurality of processing portions connected in parallel to said respective plurality of outputs, and outputting the data packet from said plurality of processing portions to an immediately following pipeline processing unit.

* * * * *